United States Patent [19]

Weiss

[11] 3,914,030
[45] *Oct. 21, 1975

[54] VIRTUAL IMAGE MAGNIFIER SYSTEM FILLED WITH A REFRACTIVE MEDIUM

[76] Inventor: Helmut Weiss, 1230 Berkshire Lane, Newport Beach, Calif. 92660

[ * ] Notice: The portion of the term of this patent subsequent to Sept. 11, 1990, has been disclaimed.

[22] Filed: July 18, 1973

[21] Appl. No.: 380,448

Related U.S. Application Data

[63] Continuation-in-part of Ser. No. 133,191, April 12, 1971, Pat. No. 3,758,196.

[52] U.S. Cl. ................. 350/296; 350/170; 350/286
[51] Int. Cl.² ........................................... G02B 5/10
[58] Field of Search ........... 350/145, 199, 286, 287, 350/296, 241, 170

[56] References Cited
UNITED STATES PATENTS 3,536,380  10/1970  Ferguson ............................ 350/199
3,758,196  9/1973  Weiss ................................. 350/241

*Primary Examiner*—Alfred E. Smith
*Assistant Examiner*—Michael J. Tokar
*Attorney, Agent, or Firm*—Browne, Beveridge, Degrandi & Kline

[57] ABSTRACT

There is disclosed a system for substantially enlarging the viewing space of a virtual image magnifier system. A magnifier having a magnifying mirror surface and a plane semitransparent mirror surface oriented so that the physical object does not obstruct the observer's view has the space between the object, the semitransparent mirror, magnifying mirror and exit surface filled with a transparent refractive material.

7 Claims, 4 Drawing Figures

VIRTUAL IMAGE MAGNIFIER SYSTEM FILLED WITH A REFRACTIVE MEDIUM

This application is a continuation-in-part of my application Ser. No. 133,191 filed Apr. 12, 1971 and entitled "Optical Magnifying System for Viewing Small Objects" now U.S. Letters Pat. No. 3,758,196, issued Sept. 11, 1973.

BACKGROUND OF THE INVENTION

It is known e.g. Copeland U.S. Pat. No. 2,883,908, that the combination of a concave mirror with a plane semitransparent mirror can serve as reflecting magnifier. The semitransparent mirror removes the physical object from the observer's line of sight, producing in its place a virtual image oriented normal to the optical axis of the concave mirror, which defines the viewing axis. Copeland cants the semitransparent mirror 45°, making the surface of the subject parallel to the viewing axis.

In my application Ser. No. 133,191, which is incorporated herein in its entirety by reference, the concept of viewing space, defined as comprising all points from which the magnified virtual image formed by the concave mirror is fully visible is fully considered. Since viewing space shrinks with increasing magnification, it sets a practical limit to the magnification that can be achieved. I have taught how maximum viewing space can be achieved by optimizing the geometry of folding.

Moreover, in my above-identified application I have taught how viewing space of an already optimally folded reflecting magnifier can be further enlarged by filling the air space between object plane, concave mirror and semitransparent mirror with refractive material to which the mirror surfaces may be applied as coatings. I also provided a refractive prism to minimize optical aberrations by making the exit surfaces essentially perpendicular to the emerging rays.

However, there are applications where the object plane and the viewing axis must be held in a predetermined relationship, different from that which optimum folding would require. Although viewing space in such case will be smaller than the maximum obtainable from optimum folding, I have discovered that it can still be substantially enlarged by filling the magnifier with refractive material. Just as in the case of optimum folding, this advantage is due to refraction at the exit surface which, by reducing the field angle to be covered inside magnifier, allows the size of the magnifier and the resulting viewing space to increase.

Thus, the present invention is directed to providing an improved reflecting magnifier comprising a magnifying mirror surface and a plane semitransparent mirror surface oriented so that the physical object does not obstruct the observer's view at the magnified virtual image, combination being augmented by filling the space between object, magnifying mirror and semitransparent mirror with refractive material.

The above and other objects and advantages and features of the invention will be more apparent from the following specification and accompanying drawings wherein:

BRIEF DESCRIPTION OF THE DRAWINGS

As indicated above, and as discussed extensively in my application Ser. No. 133,191 which is incorporated herein in its entirety by reference, the "viewing space" comprises all points from which the magnified virtual image is fully visible. In my above identified application I disclosed how a virtual image magnifier constituted by a concave mirror and a semitransparent plane mirror may have the viewing space thereof significantly enlarged by optimized folding. Moreover, I also disclosed how the insertion of refractive material in such an optical system provides significant further improvement and enlargement of the viewing space. This invention is directed to providing a substantially larger viewing space with nonoptimally folded reflecting magnifiers. Such an non-optimally folded reflecting magnifier is shown in FIG. 1 and the system per se is as disclosed essentially in Copeland Pat. No. 2,883,908. As shown in FIG. 1, this magnifier combines a concave mirror 10 with a semitransparent plane mirror 11 for enlarging an object 12. In this sytem, it will be noted that the semitransparent mirror is at an angle of 45° with respect to the viewing axis 13. As noted above, the magnification in a virtual image magnifier is limited by the space from which the magnified image is fully visible. Thus, with increasing magnification, this space shrinks and the limit of use of magnification is reached when the magnifier begins to interfer with the observer's anatomy, or eyeglasses, preventing him from placing his person, including his eye pupil, close enough to the magnifier to see the entire image.

Figure 1:
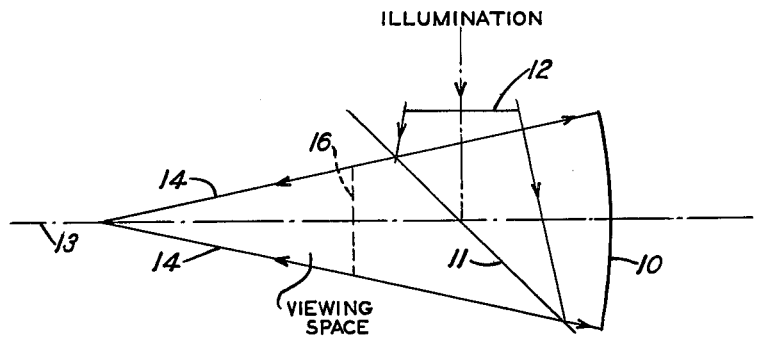
FIG. 1 shows a reflecting magnifier with semitransparent mirror canted at 45° to the viewing axis.

It should be noted that the drawings are simplified in two respects. First, the object is represented as a straight line whose length corresponds to the width of the object, but the object length in a direction normal to the plane of the drawing is diregarded. Secondly, the end points of the object are located on the focal surface of the concave mirror so that the virtual images are formed in an infinite distance. The marginal rays 14 are indicated by the arrowed lines and the non-magnified virtual image 16 is illustrated in dotted lines. The system illustrated in FIG. 1 (as are the systems illustrated in FIGS. 2 and 3) are to the scale of three to one.

Figure 2:
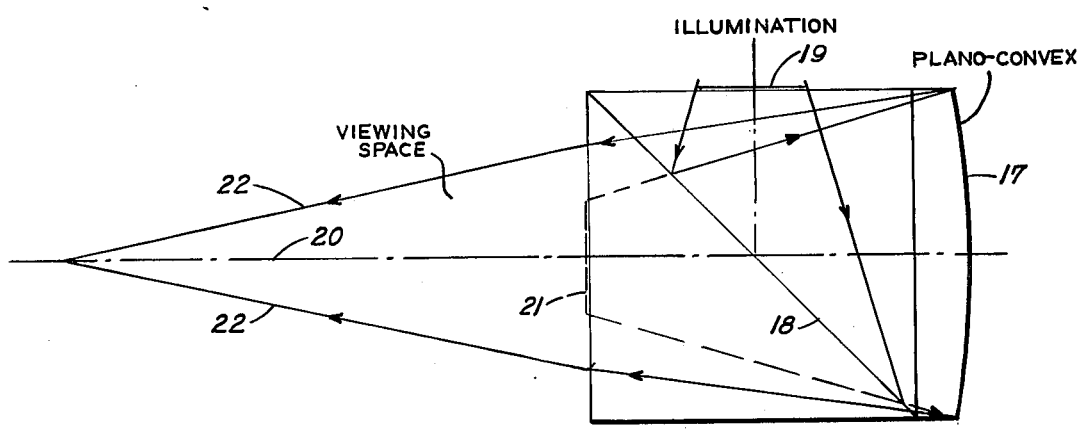
FIG. 2 shows a reflecting magnifier incorporating a preferred embodiment of the invention wherein the spaces between object, concave mirror and semitransparent mirror, and between semitransparent mirror and exit surface are filled with refractive material.

A reflecting magnifier incorporating the invention is shown in FIG. 2. In this disclosure, concave mirror 17, semitransparent mirror 18, object 19 and the viewing axis 20 have the same relative positions and angular orientations as the prior art magnifying system shown in FIG. 1. However, the spaces between the object 19, concave mirror 17 and semitransparent mirror 18 is filled with a refractive material which may be a composite, but is shown as a single integral mass of glass or plastic. Moreover, the space between semitransparent mirror 18 and the exit surface 21 is also filled with a body of refractive material. Such refractive material is fully disclosed and described in detail in my above-identified application. Moreover, the manner of making the optical parts of such system is disclosed and described in my above application. There, it is pointed out that the optical surfaces forming the optical system may be formed in various ways. For example, a solid body of clear transparent material such as glass or suitable plastic materials, such as acrylic compositions may be used. Surfaces on the solid bodies may be precisely configured and then coated with suitable reflective coating. Those surfaces of the magnifier body which do not participate in the formation of the magnified image may be of any abritrary shape as long as the optically inactive surfaces do not interfer with or disturb the passage of the marginal rays. The reflective surfaces may be made by deposition processes or other reflective coating techniques. The reflective material constituting prism body between semitransparent surfaces 18 and exit surface 21 is formed of the same material. It will be noted that the semitransparent mirror 18 is at an angle of about 45° to the optical axis of the system. As shown, the marginal rays 22 from the object frame of the same size now encloses a substantially larger viewing space.

Figure 3:
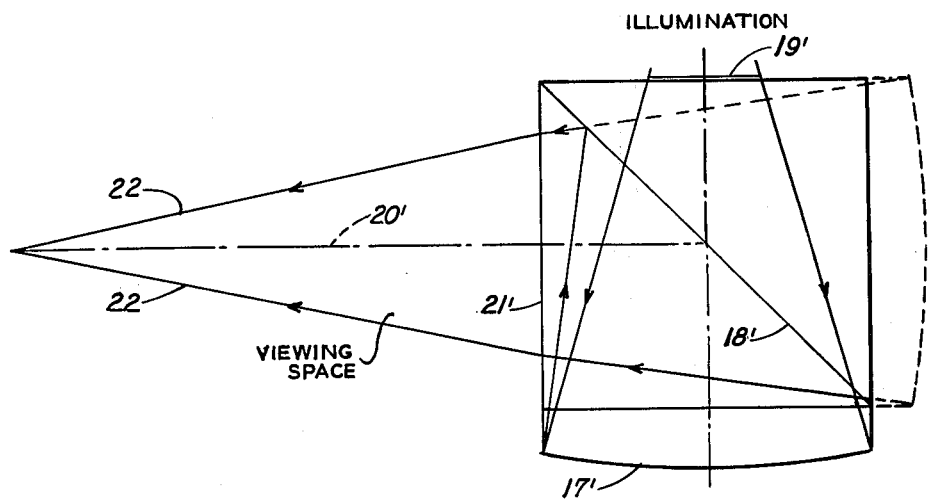
In FIG. 3, is another embodiment of the invention wherein the order of semitransparent and concave mirror is reversed.

Referring now to the embodiment illustrated in FIG. 3, in this case, the optical system is essentially the same as that shown in FIG. 2 (with corresponding parts being primed). In this system, the order of the semitransparent and concave mirrors are reversed. In this case, the concave mirror 17' now faces the object 19' and the semitransparent mirror 18' directs the rays reflected by the concave mirror 17' into the viewing space.

In both the embodiment shown in FIG. 2 and the embodiment shown in FIG. 3, the refractive material filling the space limited by the concave mirror is made up of two optically bonded parts, a prism and a plano-convex element which, has the further advantage of reducing manufacturing cost.

Figure 4:
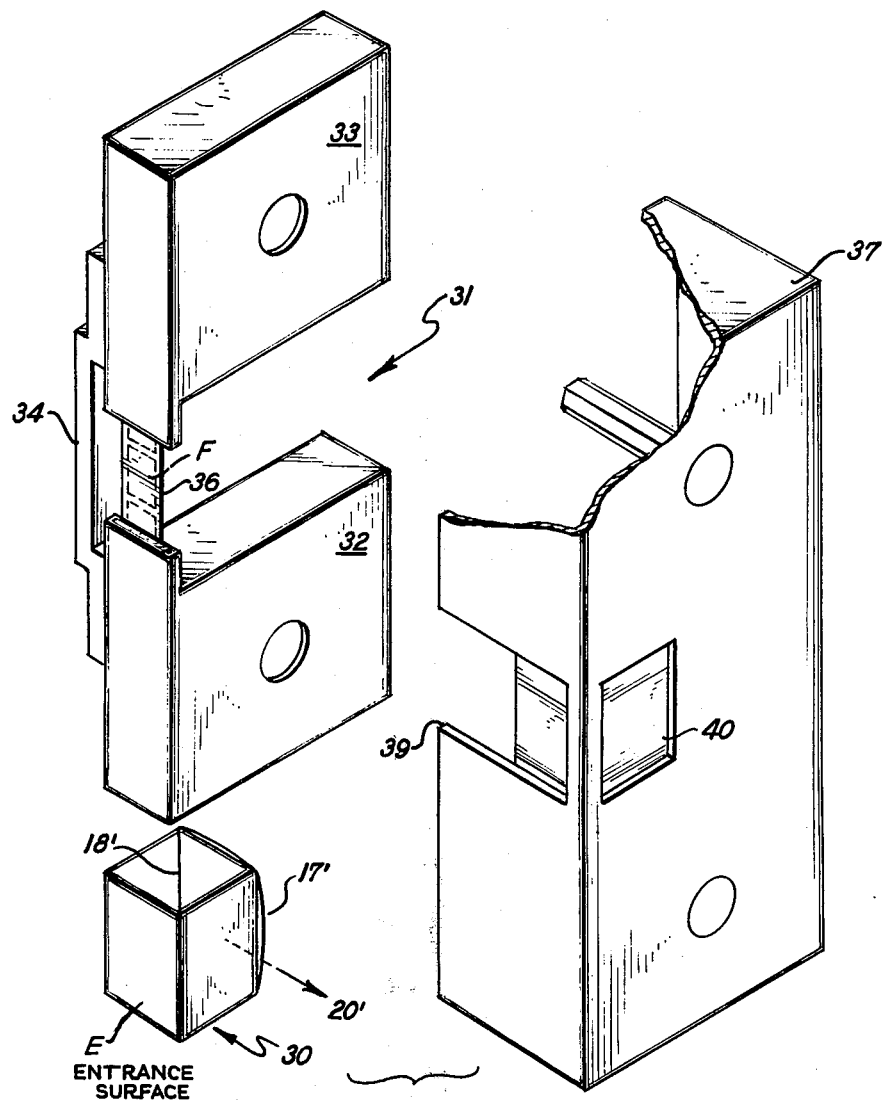
FIG. 4 shows an partially exploded isometric view of a typical application of the magnifier filled with a refractive material in accordance with this invention.

FIG. 4 shows a partially exploded isometric view of a typical viewer incorporating the invention. In this case, the magnifying element shown in FIGS. 2 or 3 is schematically illustrated and identified by the Numeral 30. A film cassette 31 has two spools or sides 32 and 33, respectively connected by a bridge element 34. Each side or box 32–33 contains a film spool which can be turned to move the film 35 in either direction. Obviously, movement or transport of the film may be mechanized in a more elaborate fashion, not here pertinent. The film may also be slides or even non-transparent objects or other image carriers suitably illuminated. A housing or bottomless case 37 is provided for receiving the film cassette 31. Magnifying element 30 is shown in a generally isometric view wherein the concave mirror 17 faces the film frame F which is to be viewed. When the cassette 31 is fitted in the case or cover 37, the film is guided between an inside wall of the case and the entrance surface of the magnifier 30. (Element 30 is of the type shown in FIG. 3.) Light for illuminating the image or object to be viewed enters through windows 39. The magnified image can be viewed through a window 40 in the top of the case.

Various changes and modifications of the above optical system may be made without departing from the spirit of my invention.

What I claim is:

1. In a virtual image magnifier system comprised of a magnifying concave mirror surface means, a plane semitransparent mirror means oriented such that the physical object to be magnified does not obstruct the observer's view at the magnified virtual image, the improvement which comprises refractive material filling the space between said magnifying concave mirror and said semitransparent mirror, said refractive material having an index of refraction greater than one.

2. The invention defined in claim 1 wherein said magnifying concave mirror surface means faces the object to be magnified and said semitransparent mirror directs rays reflected by said magnifying mirror into the viewing space.

3. The invention defined in claim 1 wherein the said refractive material comprises a prism and a planoconvex element.

4. In a magnifier for viewing small essentially two dimensional object patterns comprising a concave mirror in conjunction with a semitransparent plane mirror, said semitransparent plane mirror reflecting the object axis into the axis of the concave mirror in such a manner that the object does not obstruct the view at the virtual image magnified by the concave mirror, said plane mirror being at an angle of 45° to the viewing axis of the magnifier, said concave mirror adjoining the object surface and the semitransparent mirror, a refractive medium having an index of refraction greater than one filling the space between said object pattern, mirrors and a point along the viewing axis defining the location of an exit surface normal to said viewing axis.

5. A magnifier according to claim 4 with the concave mirror and the semitransparent mirror applied as coatings to either both or one of the two parts into which the magnifier is divided by the semitransparent mirror, and bonding means bonding said parts together for optical contact.

6. In a high magnification virtual image magnifier system comprised of a magnifying mirror element, a plane semitransparent mirror element oriented at an angle of 45° to the viewing axis of the magnifier, a refractive material having an index of refraction greater than air filling the space constituting said magnification system.

7. An optical system providing maximum viewing space of a magnified virtual image for a selected object size and magnification, said optical system comprising:
a solid body of optical refractive material provided with a planar surface area defining an object frame area, a concave surface having one edge thereof adjoining on edge of said object surface, the chord of said concave surface being at an angle of 90° to the plane of said planar object frame area,
said concave surface having a mirror coating thereon, a semi-transparent surface having one edge adjoining the edge of said concave surface opposite to that edge at which the object frame area adjoins,
said planar semi-transparent surface extending at an angle of 45° to said chord and having the opposite edge of said transparent surface adjoin said object area surface,
said solid body having a planar exit surface on the side of said body opposite to said concave surface, said exit surface being planar and normal to said viewing axis;
said entrance surface, semi-transparent surface, concave surface and exit surface being so geometrically related that the marginal rays of an object at said object area extend to said semi-transparent surface, thence to said concave mirror surface, and thence through said semi-transparent surface and exit surface whereby the apertures utilized by said marginal rays on said surfaces adjoin and are non-interfering whereby a complete magnified virtual image of the object at the object area is viewable in an enlarged viewing space located along a viewing axis which coincides with the center normal of the concave mirror surface.

* * * * *